July 2, 1968  JEAN-CHARLES PARACUELLOS  3,390,939
EQUIPMENT FOR THE PRODUCTION OF CINEMATOGRAPHIC FILMS IN THE
FORM OF ANIMATED CARTOONS
Filed Jan. 6, 1966  5 Sheets-Sheet 5
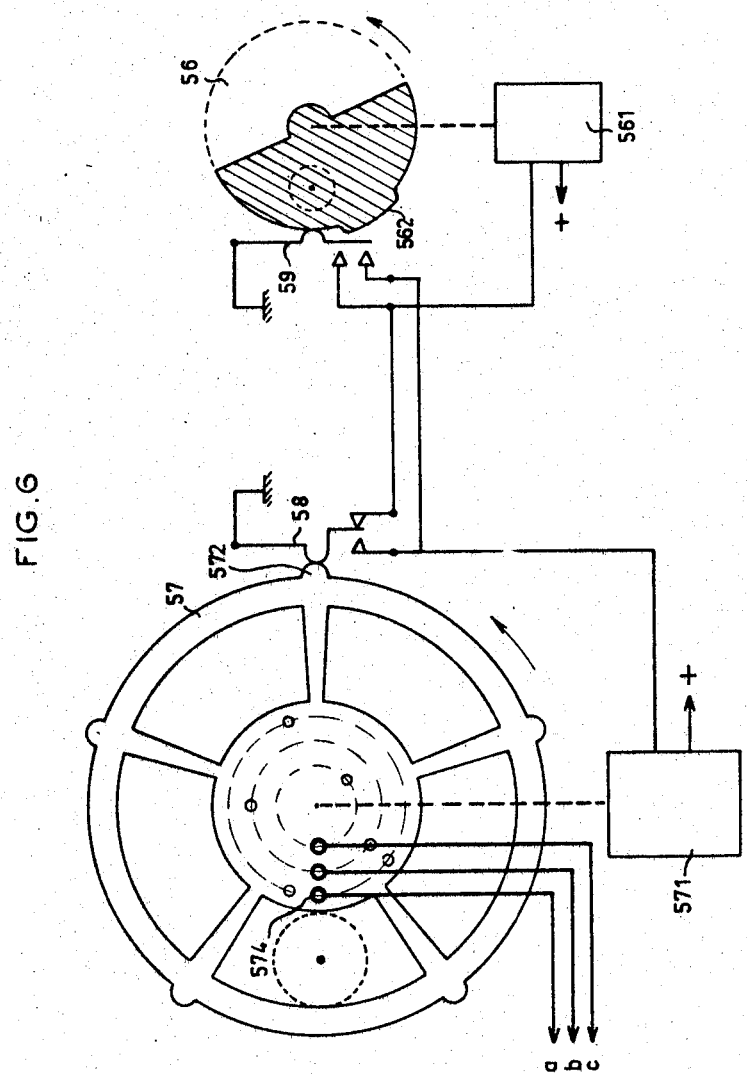
INVENTOR
JEAN-CHARLES PARACUELLOS United States Patent Office 3,390,939
Patented July 2, 1968

3,390,939
EQUIPMENT FOR THE PRODUCTION OF
CINEMATOGRAPHIC FILMS IN THE
FORM OF ANIMATED CARTOONS
Jean-Charles Paracueilos, Ville d'Avray, France, assignor to Office de Radiodiffusion-Television Francaise, Paris, France, a body corporate of France
Filed Jan. 6, 1966, Ser. No. 519,139
Claims priority, application France, Jan. 6, 1965, 999
2 Claims. (Cl. 352—87)

The present invention is concerned with apparatus for the production of cinematographic films of animated cartoons of all types intended either for projection within movie-houses or by television diffusion in a telecinema.

It is known in the production of animated cartoons films on the one hand to create in a first step images known as drawn images, each formed by the superposition of a number of images known as basic images each of which is formed on an independent transparent support and on the other hand, in a second step, to photograph these drawn images, using the technique known as "lap dissolve," to obtain images known as filmed images.

However, the creation and/or the photographing of the drawn images requires, according to the known techniques, rather complex apparatus, and in any case schedules of work in which the image transport phases are insufficiently automated cause loss of time.

The object of the invention is an equipment for the production of animated cartoon films which can be incorporated either in an animation table or in a shooting camera and which enables the difficulties and complications of the known apparatus to be overcome.

For this purpose, according to the invention, an apparatus of the type indicated comprises essentially means for separately guiding in superimposition relationship, selectively forward and backward feeding and immobilizing under tension in successive desired positions at least two continuous perforated strips, the first allocated to the animated parts of the drawn images of the cartoon film and the second to the inanimated parts of said drawn images, optical means for projecting a drawn image to the place at which the next must be drawn, a stop motion camera for photographing the drawn images onto a film, filter means for regulating the light originating from the drawn images to be photographed and allowing a plurality of drawn images to be photographed onto the same frame of said film through selected parts of said filter means and control means for the movements of the strips, stop motion camera and filter means as a function of the requirements for drawing and for exposure.

It will be seen that by comparison with the techniques of the prior art, the apparatus according to the invention makes it possible owing to the fact that the basic drawings are constituted at least in part on the strips, to mechanize all the image transporting, especially as the basic images of the only animated parts are arranged in a series on a single strip, and to obtain the drawn images by direct superimposition of a number of basic drawings, as in the conventional animated cartoon, and thus without the necessity of forming intermediate images of the background and without having to carry out repetition on film by means of a special optical mixing system, as is the case in the devices utilizing two strips for the basic images of the only animated parts.

The invention will be better understood from a consideration of a few embodiments of the device according to the invention, given by way of non-limiting examples, in conjunction with the accompanying drawings in which:

FIG. 6 is a circuit diagram of the electrical connections of the system of FIG. 3.

The production of an animated cartoon film is usually carried out in at least two steps. The first consists of making the different drawings which are necessary on suitable supports and the second in photographing these drawings or combinations of these drawings to form the final images of a cinematographic film. The equipment which is necessary, therefore, essentially comprises a table, known as an animation table, for the making of the drawings, and an exposure board or bench for photographing these drawings or their combinations. But the drawings themselves are generally obtained by the superposition of a number of partial drawings, which can be distinguished as follows:

Images known as basic images which are generally partial drawings made by a draughtsman, certain of which, however, can be replaced by preformed images, for example photographic images;

Images known as drawn images which usually result from the superposition of a number of basic drawings or partial basic drawings;

Images known as filmed images, each of which results either from a single photographic exposure of a single drawn image, or from a multiple exposure of a number of drawn images (usually two) combined in succession.

Figure 1:
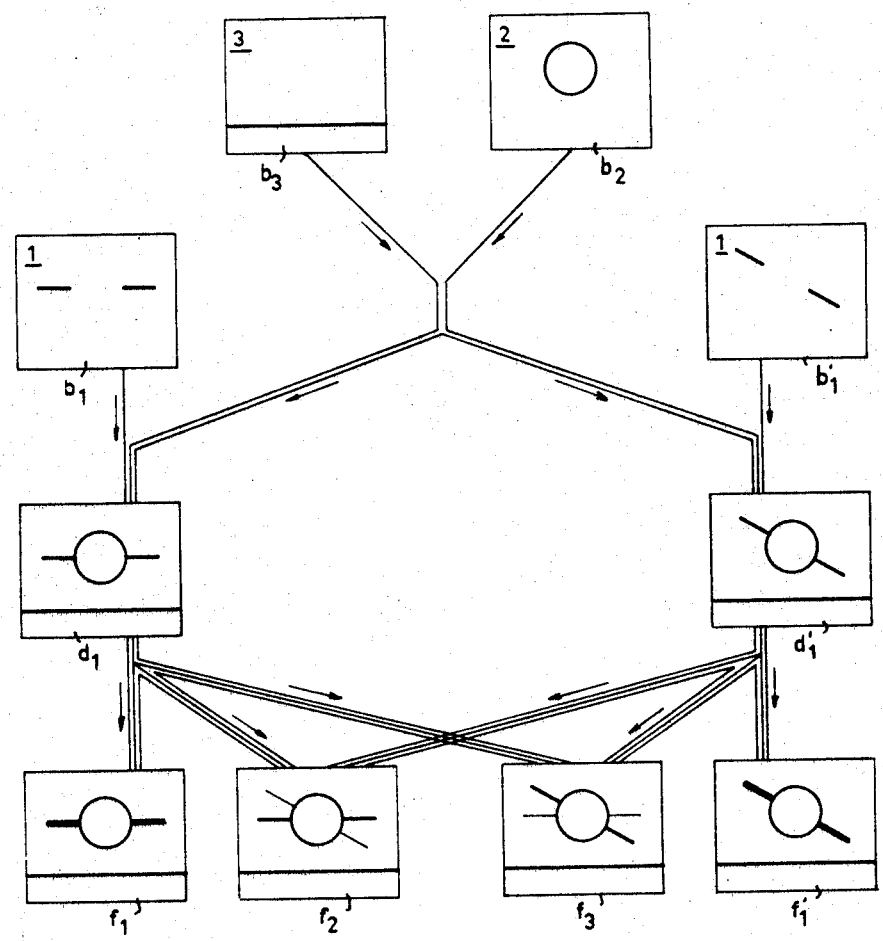
FIG. 1 is a diagram showing the successive formation of basic images, drawn images and filmed images.

FIG. 1 shows diagrammatically the process comprising successively forming the basic images $b$, then composing these images into drawn images $d$, and then combining these to form filmed images $f$. In the example selected, the basic images occupy the first two lines of FIG. 1, the drawn images the third line and the filmed images the fourth line. It will be seen that the basic images in this case are of three sorts; they are drawn on three different strips (or sections of strips). The images $b_1-b_1'$ corresponding to the animated parts are drawn on a first strip 1; the fixed parts of bodies developed in front of the background set designated by $b_2$ are drawn on a second strip 2; and the background set itself is drawn on a strip 3. The superposition of the three basic images $b_1$, $b_2$ and $b_3$ gives the drawn image $d_1$. It is only necessary to replace $b_1$ by $b_1'$ to form the next drawn image $d_1'$. The passage from one drawn image to the next is generally made by a simple movement of translation of the strip 1, on which are drawn in succession the various details corresponding to the successive movements of only the parts which move. It is only in the case of modifications of the fixed parts of the bodies in movement and/or the background set that the said passage from one drawn image to the next requires a similar movement of translation of the strip 2 and/or of the strip 3.

From each drawn image such as $d_1$, there can be exposed, for example, taking into account the next drawn image $d_1'$, three filmed images, utilizing on each occasion the same quantity of light $q$. The first image $f_1$ is the reproduction pure and simple of $d_1$, utilizing the light quantity $q$; the second image $f_2$ results from the superimposed exposures of $d_1$ and $d_1'$ utilizing respectively light quantities $2q/3$ and $q/3$; the third image $f_3$ also results from the superimposed exposures of $d_1$ and $d_1'$, but utilizing respectively the light quantities $q/3$ and $2q/3$. In the example selected, the number of filmed images is three times the number of drawn images; in order to obtain a film with twenty-four frames per second, one can start from eight drawn images and derive from each of said drawn image three filmed images.

Figure 2:
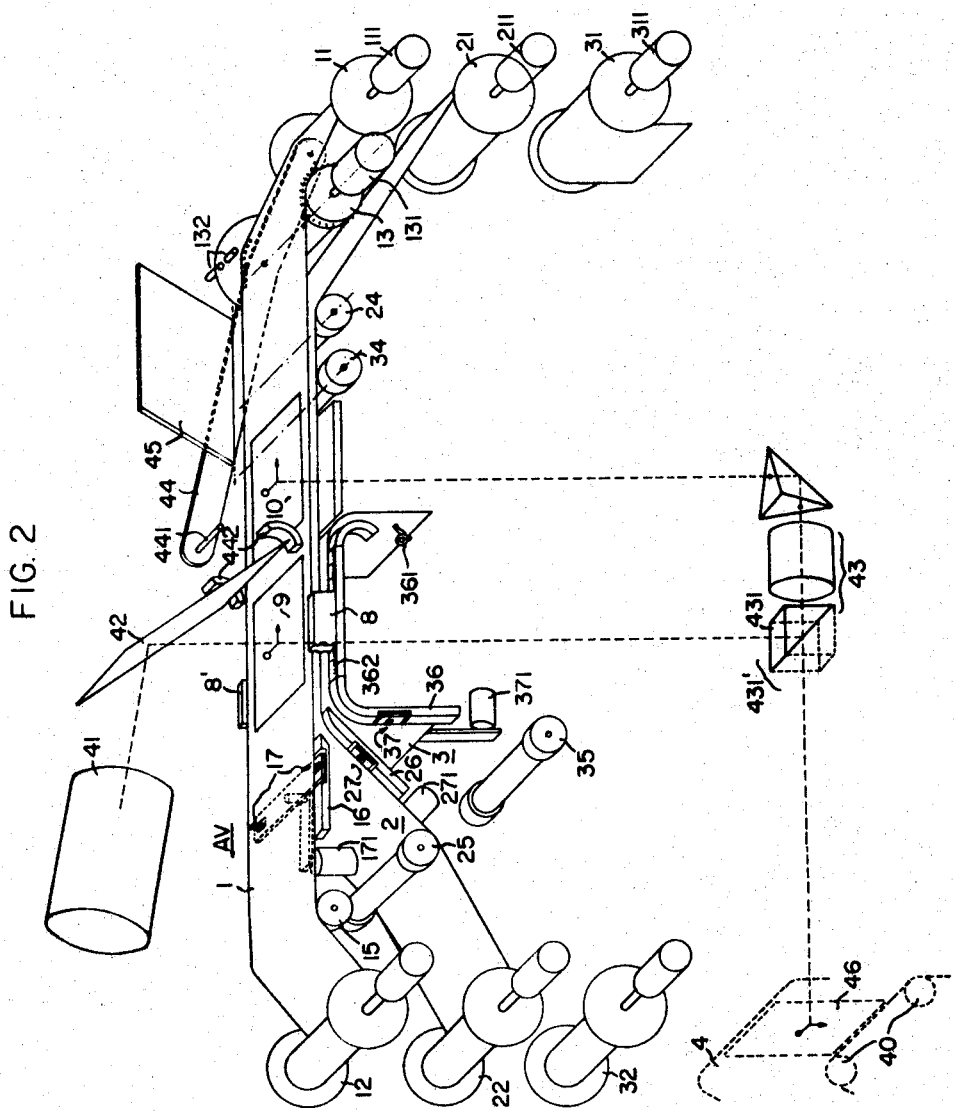
FIG. 2 is a schematic diagram in perspective of a device according to the invention incorporated in an animation table.
Figure 3:
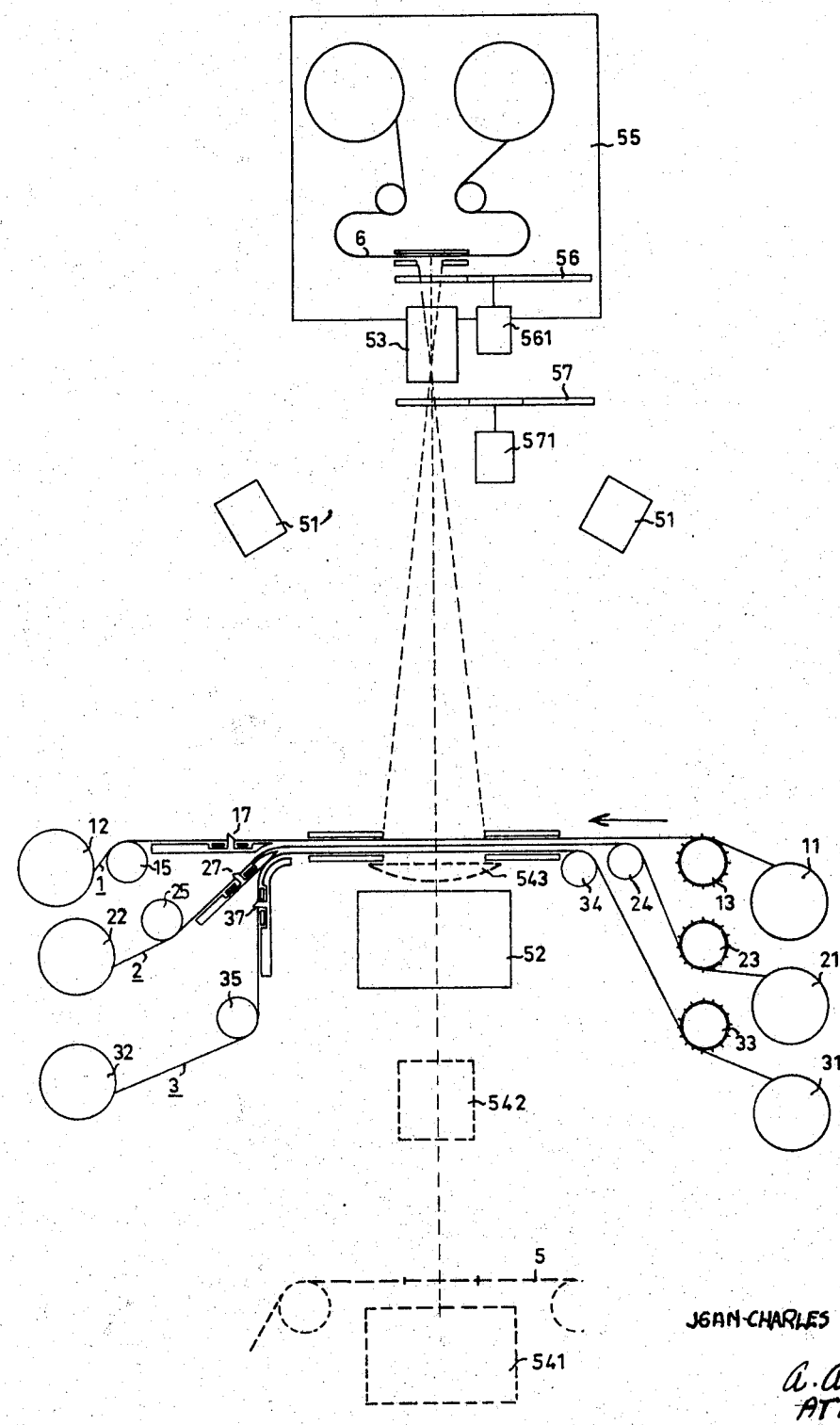
FIG. 3 shows diagrammatically in side view a device according to the invention incorporated in an exposure system.

Reference will now be made to FIGS. 2 and 3 which represent respectively an animation table and an exposure board, both incorporating a device in accordance with the invention for the driving and stopping of the strips and the combined photographing of the drawn images; it is proposed to describe the said device on the basis of the embodiments shown in these two figures, in which the same elements are given the same reference numerals. The device shown is designed for three film strips and each of these normally passes from one reel to another, each reel sometimes acting as a supply reel and sometimes as a take-up reel, the path of each strip being defined by a number of rollers one of which is provided with pins. Thus (see FIG. 3) the strip 1 goes from the reel 11 to the reel 12, passing over the pin roller 13 and the reversing roller 15; the strip 2 from the reel 21 to the reel 22, passing over the pin roller 23 and the reversing rollers 24 and 25; the strip 3 from the reel 31 to the reel 32, passing over the pin roller 33 and the reversing rollers 34 and 35. In FIG. 2, for simplicity, only one pin roller 13 (that for the strip 1) has been shown and the strip 3 has been replaced by a strip section 3'. It will also be assumed that in FIGS. 2 and 3, the normal or forward movement of the strips is from right to left in each figure, the direction indicated by an arrow on each of them.

Each of the strips can be immobilized in well defined positions, both in the transverse sense and in the longitudinal sense. For this purpose there are provided (see FIG. 2) on the one hand an assembly of guides, such as 8 and 8' for all three strips, 16 for strip 1, 26 for strip 2 and 36 for strip 3; and on the other hand double claws, 17 for strip 1, 27 for strip 2 and 37 for strip 3, capable of engaging in the perforations of the strips by relative movement either of the strips or of the claws.

In the longitudinal direction of the strips, it is generally necessary not only for each strip once immobilized to have its perforations engaged by its own claw, but also that the strip shall be placed under tension (in the direction from left to right in the case of the two FIGS. 2 and 3). This tensioning can be obtained in different ways: either by the action of the motor 131 on the pin roller 13 (in the case of strip 1), or by the action of the motor 211 on the reel 21, here acting as a supply reel (in the case of strip 2) or by the action of a simple spring claw 361 (in the case of the strip section 3'). It should also be noted that the relative positions of the three claws are such that at the area 9 the perforations of the three strips are superposed.

Each of the three strips can be displaced, the control of this displacement being either manual or automatic. It will be assumed that it is desired to effect the displacement of the strip 1 of FIG. 2 by steps comprising a whole number of perforations corresponding rigorously with the length of a drawn image. The advancement or the withdrawal of the said strip is carried out by means of the motor 131 and the electromagnet 171. Each actuation of the displacement control causes the following sequence of operations:

(a) Relaxation of the tension exerted by the motor 131;

(b) Withdrawal of the claw 17 by the energization of the electromagnet 171 and subsequent relative movement in the vertical direction either of the strip 1 or of the claw 17;

(c) Advancement or withdrawal of the strip under the action of the motor 131 to a position corresponding approximately with the adjacent drawn image, but very slightly in advance of, or behind, the final position of immobilisation.

(d) The application of the strip over the claw (or vice-versa) by the restoration of the electromagnet 171 to its de-energized condition.

(e) Slight movement of the strip permitting the introduction of the claw into the desired perforations in order that the displacement finally corresponds with the exact length of a drawn image, and restoration of tension to the strip, all this being effected by the action of the motor 131.

This sequence of operations can be effected automatically by a suitable switching member 132, of electromechanical or electronic kind. The operation (c) in particular is controlled by programming the rotation of the pin roller 13, the member 132 indexing each displacement of the strip—which corresponds exactly with one turn or a simple fraction $1/n$ of a turn of the roller 13—for example by means of a photoelectric cell sending a pulse to an actuator control circuit when it is illuminated, from a lamp facing it, by the passage of an aperture in a perforated disc.

The immobilization of the pin roller 13 in the indexed position by the member 132 can be obtained, for example, by exercising a permanent braking on the axis of the roller 13 by means of a friction device and by controlling the opening of the supply circuit of the motor 131 by an electric pulse generated by the member 132.

Each of the strips 2 and 3 can also be displaced automatically in the same way, in these cases by means of the electromagnets 271 and 371 and motors not shown similar to motor 131 and driving respectively pin rollers 23 and 33.

However, as has already been stated, each of the strips can also be displaced under manual control, through a distance corresponding to any integral number of perforations, or even a non-integral number of perforations, the claws being then withdrawn and the displacement indexed with respect to a graduated scale such as the scale 362.

On the animation table of FIG. 2, it is assumed that the strips 1 and 2 have been drawn as far as the area 9 of the strip 1, and that the strip 3 is, as already stated, a simple section of strip carrying only a basic image. At the area 9 there are thus three superimposed basic images forming a drawn image.

By means of a projector 41, a mirror 42 and an optical device 43, known per se, the said image is faithfully returned to the area 10 where the strip 1 is plain. Assuming that one of the strips has a roughened surface or that an auxiliary roughened surface has been placed at 10, the draughtsman can make a new basic image at 10, taking into consideration all the elements (fixed and animated parts) of the preceding drawn image. It will be observed that the drawing can be made either on the strip 1 directly, or on the strip 2, after having raised the arm 44 which pivots about the shaft 441, which supports the whole of the device for engaging and feeding the strip 1 and which thus permits the disengagement of this strip over the whole of the extent of the area 10; the strip 1 is thus raised at a right-angle, resting on the rounded guides 442. In each case, the drawing is made while resting the hand on the frame 45. This frame pivots to enable it to be momentarily withdrawn when it is necessary to raise the strip 1. The weight of the hand of the draughtsman applied to this frame can be used to bring into mutual contact the three strips, which are normally very slightly separated from one another during their movement.

It is, therefore, only necessary to cause the strip 1 (or the strip 2) to advance through a distance corresponding to the length of one image in order to execute a new drawing, and so on. However, arrangements other than that represented in FIG. 2 are possible; the strips 2 and and 3, indepndently of one another, can be either wound on reels or left free at one end or at both ends simultaneously; they may comprise a single drawing or a number of drawings, and may or may not extend at the level of the area 10; finally, they may be gradually displaced (which enables the background to be given a travelling effect).

One can also lead another strip or section of a strip to the area 10, above the strip 1, holding it there by the claw 17. In this way one can make a new drawing of a fixed part, taking into consideration the elements of the preceding image, and this drawing can then replace a basic image of strip 2 or of strip 3. At the end of the work it is possible, if desired, to reconstitute continuous strips by sticking different sections, in order to facilitate exposure.

It is also possible to recopy images which are not located on the three strips by replacing the prism 431 of the device 43 by a double prism 431' which allows an auxiliary image located at 41 to be projected onto the area 10. This auxiliary image will then be reproduced at 10 mixed with the drawn image located at 9; this image may belong to a succession of drawings already made on a strip 4 (or a section of strip) or to a succession of filmed images, and may be an image or a succession of images which it is desired to retake; in this case, a supplementary device 40 for feeding and immobilizing, which may be manual or automatic like that of strip 1, can be provided.

The animation table enables the making of the drawings proper. The colouring or the opacification of the strips, necessary to permit the superposition over the background of a part which is supposed to be non-transparent and which does not require special equipment, is done separately, before the exposure.

In the exposure board of FIG. 3, which resembles a conventional tilting bench, the usual platform is replaced by a device according to the invention for immobilizing and feeding the strips, this device being similar to that of the animation table.

A device constituted by the front light projectors 51 and 51' and a light box 52 enables the illumination of the drawn images simultaneously by reflection and by transmission of light. The drawn image formed by the superposition of the three strips is reproduced on the film by means of an optical device 53. The optical device 43 for reversing the image in the case of the animation table is eliminated, but can be replaced by a back projection device 54 comprising a projector 541, an optical device 542 and a field lens 543 placed against the strips (all these being shown in dotted lines) which, when the light box 52 is withdrawn, enable the introduction of supplementary background provided on an auxiliary strip 5.

A shooting camera 55 contains parts for carrying out the following functions: a motor (not shown) causes the advancement of the film 6 in an intermittent fashion and independently of the rotation of the shutter, a motor 561 rotates a shutter disc 56, a motor 571 rotates a filter disc 57 or any other device which will ensure that a given quantity of light will expose the film. This latter disc may carry, for example, a clear transparent sector and a number of neutral grey transparent sectors of various densities, the sum of the quantities of light transmitted by the two elements of any pair being equal to the quantity of light transmitted by the clear sector. As the exposures of a filmed image by two adjacent drawn images are effected successively through the two elements of a given pair, the total quantity of light exposing the said filmed image is the same as when the filmed image is made by a single impression through the only clear sector.

The controls for these different motors are electrically interconnected and are connected to those for the motors responsible for the movement of the strips in such a manner as to obtain the desired combinations of drawn images. Thus, for example, when it is desired to obtain the succession of filmed images shown in FIG. 1, the group of controls of the board is programmed in such a manner as to effect the following succession of operations:

(a) The three strips being superimposed to form the image $d_1$, the disc 57 is rotated to interpose a clear sector;

(b) The disc 56 is rotated to cause exposure of the film;

(c) The film is advanced by one image and the disc 57 is rotated to interpose a sector $\frac{2}{3}$ (a filter transmitting two-thirds of the total quantity $q$ of light exposing each image);

(d) The film is exposed;

(e) A sector $\frac{1}{3}$ is interposed and the strip 1 is advanced to form the drawn image $d_1'$;

(f) The film is exposed;

(g) The film is advanced and a sector $\frac{2}{3}$ is interposed;

(h) The film is exposed;

(i) A sector $\frac{1}{3}$ is interposed and the strip 1 is pulled back to form once again the drawn image $d_1$;

(j) The film is exposed, and so on.

A new cycle recommences, subject to any modification which requires a new program.

The program for the cycle can be attached to a disc which makes one revolution per cycle. This disc may be part of the filter device 57. The changing of program can be effected by a simple manual switching to another disc or can be carried out by means of a group programmer, on perforated tape for example, which controls the nature of the cycle to be used for each drawn image as well as the advancements or withdrawals of the strips. In this case, the draughtsman can prepare the program at the drawing stage and the exposure then becomes entirely automatic.

Figure 4:
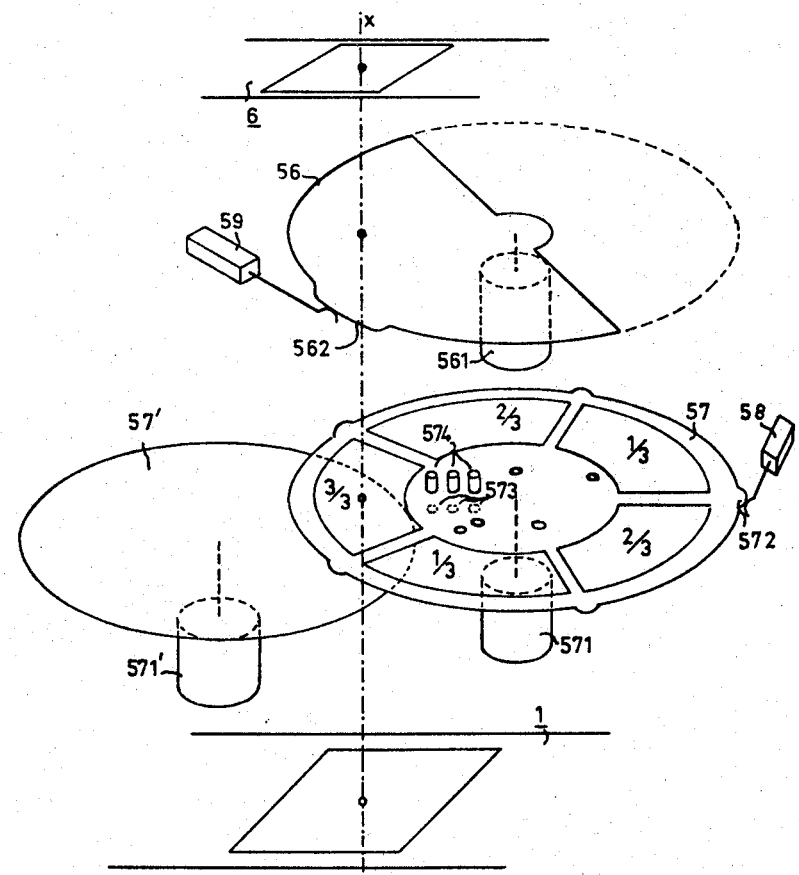
FIG. 4 shows diagrammatically in perspective the different mobile elements of the system of FIG. 3.
Figure 5:
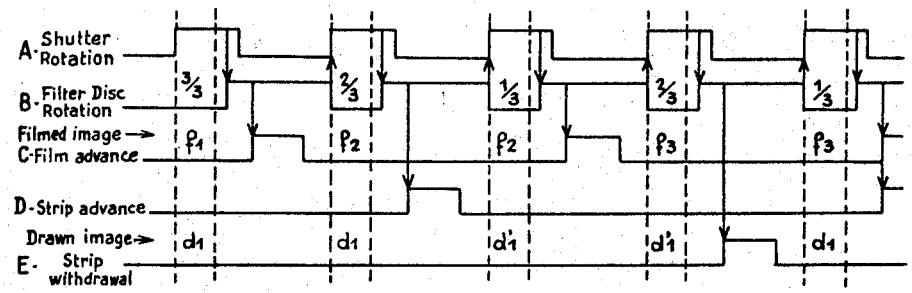
FIG. 5 is a diagram of the operations successively carried out in the course of a program cycle of the system of FIG. 3.

The possibilities thus offered by the device according to the invention can be discussed in detail by means of one non-limiting example which is the subject of FIGS. 4–6.

FIG. 4 shows in perspective different mobile elements of the system of FIG. 3: the strip 1, the film 6, the shutter disc 56 and its driving motor 561, the filter disc 57 and its driving motor 571, these two discs being eccentric with respect to the optical axis $x'x$. In this embodiment the program for the cycle is determined by the filter disc. Several filter discs 57, 57' . . . can be interposed in the path of the luminous rays in such a manner as to provide a choice between a number of different cycles. It will be assumed in the following that the filter disc and the control circuits correspond to the cycle which has already been given as an example (FIG. 1). As a consequence, the disc 57 carries a series of five uncoloured filters of which the transmission factric pulses which are transmitted into three circuits concorrespond to the five successive filtering values necessary for the five successive exposures of the film in the course of a cycle. This disc additionally comprises at its periphery, five projections such as 572 which place a contactor 58 in its operated condition when any one of the filters is brought into position in the luminous path. Finally, the disc includes in its central part apertures disposed in concentric circles, these apertures allowing light from lamps 573 located on one side of the disc to pass to photoelectric cells 574 located on the other side. The cells 574, which are three in number in the given example, convert the luminous impulses which they receive when the disc 57 rotates, into electric pulses which are transmitted into three circuits controlling respectively:

(a) The advancement of the film;
(b) The advancement of the strip 1;
(c) The withdrawal of the strip 1.

The shutter disc 56 is formed with a cam comprising a projection 562 which places a contactor 59 in its operated position for a part of the range of obturation.

FIG. 5 is a diagram of the operations successively effected in the course of a cycle. For each mobile element, the upper position of the line corresponds to the period of movement. The arrows indicate the actuations and their origin. The dotted vertical lines define the film exposure periods and the references indicate the positions of the different elements during the various periods.

FIG. 6 is a diagram of the electrical connections and enables the operation of the device to be described.

When the filter disc 57 is stopped in a position such that the sector 3/3 is interposed in the luminous path, the contactor 58 is brought into operation. As a consequence, the motor 561 is energized and rotates the shutter 56. The projection 562 of the latter brings into operation the contactor 59. As a consequence, the motor 571 is energized and causes the filter disc 57 to rotate. The contactor 58 returns to its rest condition. The shutter 56 continues, however, to rotate because the motor 561 is now energized through the contactor 59, the length of the projection 562 being sufficiently great for the return of the contactor 59 to its rest condition to take place after that of the contactor 58; once the contactor 59 has returned to rest, the motor 561 ceases to be energized and the shutter 56 stops after having effected one rotation.

In addition, a little after the beginning of the movement of the filter disc 57, the operations which may be required to advance the film and/or the strip 1, are initiated by the passage of apertures controlling respectively the circuits (a) and (b) or (c), as already seen.

The rotation of the filter disc 57 is sufficiently slow for these operations to be terminated when the disc arrives at the following position 2/3. At this moment, the corresponding projection 572 brings the contactor 58 into operation, and so on.

The damping of the two discs 56 and 57 is sufficient to ensure that after the opening of the supply circuits of their motors, their remaining movement due to their inertia is small (a few degrees).

When it is desired to carry out at the same time as the displacement of the strip 1 a "travelling operation" with one of the other strips, the driving motor for this strip is given a step-by-step operation, the control pulse for each step being the advancement pulse for the film and the strip being then separated from the immobilizing claw.

Although the drawing position and the stop motion camera of the apparatus have been represented in two different figures, it must be understood that they are mounted on the same bench and suitably spaced apart along the strip path in order for the camera not to inconvenience the cartoonist.

What I claim is:

1. Apparatus for the production of animated cartoon films comprising in combination means for separately guiding at least two continuous perforated transparent strips, the first strip being allocated to the animated parts of the film images and the other to the inanimated parts of said film images, separate means for forward and backward selectively driving and immobilizing under tension in successive desired positions each of said strips, optical means for projecting a drawn image formed by superimposed selected images in said strips to the place at which the next image is at least partially to be drawn, a stop motion camera for photographing the drawn images onto a film, filtering means for regulating the light originating from said drawn images to be photographed and allowing a plurality of drawn images to be successively photographed onto the same frame of said film through selected parts of said filter means and control means for said driving and immobilizing means, stop motion camera and filtering means as a function of the requirements for the selection of each superimposed image and for the exposure of said film.

2. Apparatus for the production of animated cartoon films comprising in combination means for separately guiding in superimposition at least two continuous perforated transparent strips, the first strip being allocated to the animated parts of the film images and the other to the inanimated parts of said film images, separate means for forward and backward selectively driving and immobilizing under tension in successive desired positions each of said strips, optical means for projecting a drawn image formed by superimposed selected images in said strips to the place at which the next image is at least partially to be drawn, means for spacing apart at said place said strips from one another whereby the projected image can be transferred on a selected one of said strips, a stop motion camera for photographing the drawn images onto a film, filtering means for regulating the light originating from said drawn images to be photographed and allowing a plurality of drawn images to be successively photographed onto the same frame of said film through selected parts of said filtering means and control means for said driving and immobilizing means, strip spacing apart means, stop motion camera and filtering means as a function of the requirements for the selection of each superimposed image, for the strip onto which the drawn image is to be transferred and for the exposure of said film.

References Cited

UNITED STATES PATENTS

| | | | |
|---|---|---|---|
| 1,198,598 | 9/1916 | Sudmann | 352—52 |
| 1,715,230 | 5/1929 | Gilmartin. | |
| 2,351,634 | 6/1944 | Place | 352—51 |
| 3,350,158 | 10/1967 | Blattner. | |

JULIA E. COINER, *Primary Examiner.*